United States Patent [19]

Leinemann

[11] 4,148,336
[45] Apr. 10, 1979

[54] PILOT CONTROLLED MEMBRANE VALVE

[75] Inventor: Hubert Leinemann, Braunschweig, Fed. Rep. of Germany

[73] Assignee: Braunschweiger Flammenfilter Leinemann & Co., Braunschweig, Fed. Rep. of Germany

[21] Appl. No.: 760,950

[22] Filed: Jan. 21, 1977

[30] Foreign Application Priority Data

Feb. 10, 1976 [DE] Fed. Rep. of Germany ....... 2605015

[51] Int. Cl.² .......................................... F16K 31/128
[52] U.S. Cl. ..................................... 137/491; 137/492
[58] Field of Search ....................... 137/491, 489, 492; 251/65

[56] References Cited

U.S. PATENT DOCUMENTS

| | | | |
|---|---|---|---|
| 2,333,522 | 11/1943 | Clifton | 137/491 |
| 2,576,516 | 11/1951 | Jurs | 137/491 |
| 2,672,827 | 3/1954 | McGowen | 251/65 X |
| 2,890,714 | 6/1959 | Greenwood | 137/491 X |
| 2,999,509 | 9/1961 | Hankison | 251/65 X |
| 3,465,771 | 9/1961 | Tishler | 251/65 X |

FOREIGN PATENT DOCUMENTS

1360867 4/1964 France ....................................... 137/491

Primary Examiner—Alan Cohan
Attorney, Agent, or Firm—Michael J. Striker

[57] ABSTRACT

A pilot controlled membrane valve for ventilating containers or the like comprises a valve housing having a first valve seat between the inlet and outlet of the housing. First valve means, movable between a closed position engaging said first valve seat and an open position, include a first membrane extending transversely through the housing and defining with the latter to one side of the first valve seat a valve chamber, which is connected by an overpressure passage means to the inlet. The valve includes further a pilot valve having a second seat, second valve means including a second membrane and being movable between a closed position engaging the second valve seat and an open position, a second outlet, means biasing the second valve means to the closed position and chamber means under atmospheric pressure surrounding the biasing means, in which the cross-section of the second valve seart and that of the second outlet is greater than the open cross section of the overpressure passage means.

2 Claims, 6 Drawing Figures

PILOT CONTROLLED MEMBRANE VALVE

BACKGROUND OF THE INVENTION

The present invention relates to a pilot controlled membrane valve for ventilating containers, apparatus or the like, comprising a valve housing having a first valve seat between the inlet and outlet of the housing, first valve means movable between a closed position engaging the first valve seat and an open position and including a first membrane extending transversely through the housing and defining with the latter to one side of the first valve seat a valve chamber which is connected by overpressure passage means to the inlet. The valve includes further a pilot valve having a second valve seat, second valve means including a second membrane and being movable between a closed position engaging the second valve seat and an open position, a second outlet, and means biasing said second valve means to the closed position, wherein the cross section of the second valve seat and that of the second outlet is greater than the open cross-section of the overpressure passage means.

Such valves are employed when use of remote controlled valves is too expensive or for reasons of safety cannot be applied and if, on the other hand, the operating conditions of the valve make it necessary that the pressure at which the valve opens is closely adjacent to the maximum operating pressure and if, in addition, a high degree of sealing up to the region of the valve opening pressure must be provided and/or the valve, after initial opening, must be opened to the maximum extent without increasing the operating pressure.

In a known valve of the above-mentioned construction, the pilot valve is in form of a disc valve which is controlled by membranes. An essential disadvantage of such a construction is in the rather complicated construction of the pilot valve control which is therefore liable to malfunction. This disadvantage is further increased in that, in the known construction, the medium passing through the valve flows around the pilot control mechanism, which may lead to an additional disturbing of its function. This holds especially true if the medium passing through the valve may cause corrosion, soiling or forming deposits on the various elements of the pilot valve. A failure of the pilot valve will lead to a complete breakdown of the valve arrangement, which may entail considerable damage or accidents.

SUMMARY OF THE INVENTION

It is an object of the present invention to provide a pilot controlled membrane valve of the aforementioned kind in which the operation of the pilot valve is improved, as compared to such valves known in the art.

It is a further object of the present invention to provide a pilot controlled membrane valve of the aforementioned kind in which the control mechanism of the pilot valve is simplified in its construction so that it will operate trouble-free under extended use.

With these and other objects in view, which will become apparent as the description proceeds, the pilot controlled membrane valve according to the present invention, for ventilating containers or the like, mainly comprises a valve housing having an inlet and an outlet, a first valve seat within said valve housing connected to said inlet, first valve means movable between a closed position engaging the first valve seat and an open position including a first membrane extending transversely through the housing and defining with the latter to one side of the first valve seat a valve chamber, overpressure passage means connecting the valve chamber with the inlet, a pilot valve having a second valve seat in communication with the valve chamber, second valve means including a second membrane and being movable between a closed position engaging the second valve seat and an open position, a second outlet for the pilot valve, means biasing the second valve means to the closed position, and chamber means under atmospheric pressure surrounding the biasing means and separated from the second outlet by the second membrane, in which the cross-section of the second valve seat and that of the second outlet is greater than the cross section through the overpressure passage means.

Since the biasing means for the valve means of the pilot valve are arranged in a chamber, separated from the second outlet by the second membrane and maintained under atmospheric pressure, the fluid medium passing through the valve will not come into contact with these biasing means. Furthermore, since the main valve and the pilot valve are controlled by a membrane, the valve according to the present invention does not require guide elements with close tolerances.

In an advantageous modification of the present invention, the pilot valve may have a surge characteristic, such that the biasing force of the biasing means, which tends to move the second valve means to the closed position, decreases with increasing distance of the second valve means from the second valve seat. This will produce especially advantageous operating conditions, as will be explained, later on, on hand of one of the embodiments disclosed.

In a constructive advantageous form of the present invention, which facilitates servicing of the arrangement, the pilot valve may include a removable valve cap which surrounds the control mechanism, or biasing means of the pilot valve.

For certain operating conditions it may be advantageous to construct the pilot valve as an independent unit, releasably mounted on the valve housing of the main valve. At a malfunction of the pilot valve, respectively if the operating conditions are to be changed, a newly adjusted pilot valve may then be connected to the valve housing of the main valve.

For reasons of safety of operation and protection of the environment, it is advantageous if the outlet of the pilot valve is connected by means of a pressure-equalization tube with the outlet socket of the housing. If this pressure-equalization tube is provided with an adjustable throttle, it is possible to vary the pressure difference between the response pressure and the closure pressure of the valve in a simple manner. In this way a closing pressure can be obtained which is closely adjacent to the response pressure of the valve.

The requirement for quick and complete opening of the main valve at the opening of the pilot valve may be efficiently supported if the pressure equalization tube ends with an ejector opening into the outlet socket of the housing. The suction of gas from the valve chamber will thereby be increased by the produced injector action. In this way it is possible to reduce the cross-section of the pilot valve, respectively the cross-section of its pressure equalization tube with respect to the overpressure passage means between the valve chamber and the inlet socket of the housing.

If the valve is constructed for controlling a fluid medium which tends to lead to deposits of dirt, then it is advantageous that the outlet of the pilot valve is connected with the gas outlet of the housing by means of a large volume connecting chamber.

If in the container or the like, connected to the valve an underpressure below atmospheric pressure can occur and if it is desired that no air will flow in such a case from the surrounding atmosphere into the container, then it is advantageous to provide a check valve in the connection between the valve chamber and the inlet socket of the housing, which will assure that an underpressure in the container or the like will not be transmitted to the valve chamber so that the main valve will remain closed.

The overpressure passage means between the valve chamber and the inlet socket of the housing may also be formed by a pressure equalization passage in the valve disc of the main valve. In this case air may flow also to containers or the like which are connected to the valve if an underpressure should occur in the connected container or apparatus.

An especially perfect sealing of the valve can be obtained when the valve means comprise a valve disc guided by a membrane and when the seal at the valve seat, at least at the main valve, will be formed by the membrane of the latter. In this case it is advantageous if the membrane of the main valve, opposite the valve chamber in the region of the valve seat of the main valve, is freely movable relative to the valve disc connected thereto. It is thereby especially advantageous when the valve disc of the main valve has a diameter which is smaller than the diameter of the valve seat thereof and in which the arrangement includes a support, preferably adjustable in vertical direction, against which the valve disc of the main valve abuts in the closed position of the valve. If in this construction the valve disc starts to move away from its support, then the membane will still abut, at the beginning of a small movement of the valve disc, against the valve seat and be pressed on thereon due to the pressure in the valve chamber. This will be especially advantageous when, for instance for the reason of chemical stability, relatively hard materials have to be used for the valve seat, respectively the membrane. In this case, the membrane is pressed, by the pressure acting thereon, onto the outer edges of the valve seat, whereby the sealing effect is increased.

If the valve has to handle especially critical products, especially products which lead to crystallizing, polymerization or sublimation, it is advantageous to provide heating coils in the interior of the valve housing. Such heating coils have thereby to be arranged so that all elements of the valve, which are impinged by the fluid medium, will be sufficiently heated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
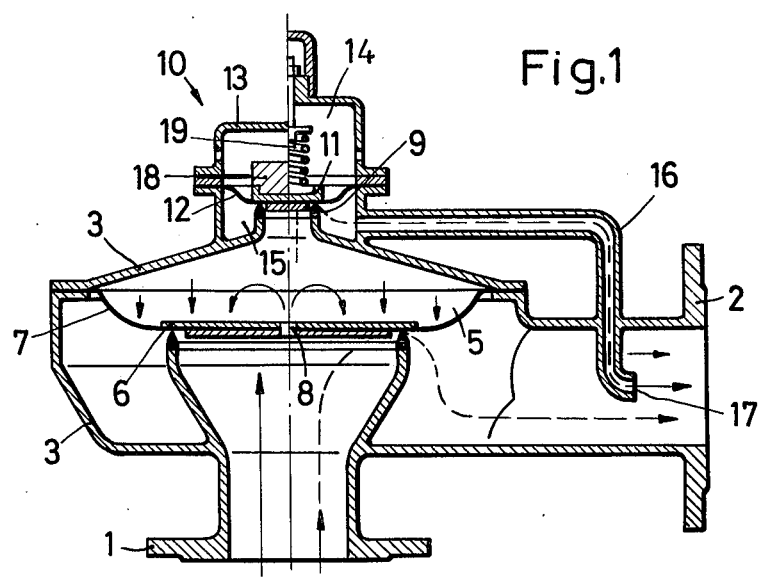
FIGS. 1-4 respectively illustrate vertical cross-sections of four different embodiments of pilot controlled membrane valves according to the present invention.

Referring now to the drawing and more particularly to FIG. 1 of the same, it will be seen that the valve according to the present invention illustrated therein comprises a valve housing 3, provided with an inlet or inlet socket 1 and an outlet or outlet socket 2. The valve housing 3 encloses a first valve seat 4 of the main valve, as well as a valve chamber 5 located above the valve seat 4.

Figure 5:
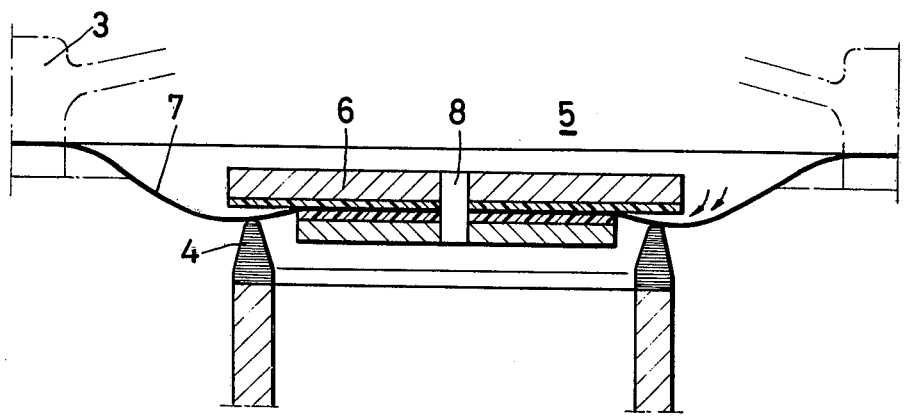
FIG. 5 illustrates on an enlarged scale a detail of FIG. 1 in vertical cross-section.

The first valve means of the main valve, illustrated in FIGS. 1 and 5, comprises a first valve disc 6 and an annular first membrane 7 clamped at its inner and outer periphery respectively to the valve disc 6 and the valve housing 3. Contrary to the usual arrangement, the membrane 7 serves not only to guide the valve disc 6, but serves also as a seal of the valve means on the valve seat 4. As can be clearly visualized from FIG. 5, the annular portion of the membrane 7, opposite the valve chamber 5 in the region of the valve seat 4, is freely movable with respect to the valve disc 6 and is thereby at this region impinged by the pressure of the valve chamber 5, as indicated by the arrows, at the right side of FIG. 5, to be thereby securely pressed onto the valve seat 4. Pressure equalization passage means in form a central opening 8 in the valve disc 6 connect the inlet socket 1 with the valve chamber 5.

The valve housing 3 forms at its upper end a second valve seat 9 for the pilot valve 10. The valve means of the pilot valve 10 likewise comprise a second valve disc 11 to which the inner periphery of a second membrane 12 is connected, whereas the outer periphery of the membrane is held on the valve housing 3 by a pilot valve cap 13, releasably connected thereto. In this way, the control mechanism for the pilot valve, that is the mechanism which biases the valve means of the pilot valve to the closed position, is located in a pilot valve chamber 14 which is securely sealed off from the pilot valve outlet 15 by the second membrane 12 and which may be maintained under atmospheric pressure by an opening in the cap 13. The pilot valve outlet or second outlet 15 is connected by means of a pressure equivalization tube 16 with the outlet socket 2 of the valve housing and the tube 16 ends in the latter with an injector port 17.

The biasing means which biases the second valve means 11, 12 to the closed position may be constituted by a weight 18, as shown at the left half of FIG. 1, or, alternatively, by a compression spring 19, as shown at the right half of this Figure.

A container or the like, not shown in the drawing, is fluid-tightly connected to the inlet socket 1 of the housing into which a gaseous fluid may pass if the pressure in the container is lower than atmospheric pressure or pressure maintained at the outlet 2, or from which fluid may be discharged when the pressure in the container is greater than atmospheric pressure or pressure at the outlet 2 of the valve housing. Through the pressure equivalization passage means or opening 8 in the valve disc 6, a pressure will be established in the valve chamber 5 equal to the pressure in the container or the like connected to the inlet socket 1. Since the surface area of the valve means 6, 7 facing the valve chamber 5 is greater than that facing the inlet socket 1, the valve means 6, 7 will, at overpressure, be securely pressed against the valve seat 4. When the pressure in the connected container or the like and therewith the pressure in the valve chamber 5 reaches the response pressure of the pilot valve 10, the latter will open. The pressure in the valve chamber 5 will then decrease over the opened pilot valve 10 and the pressure equalization tube 16, so that an overpressure will form below the first valve disc 6 to open the main valve. This function is assured when the cross-section of the second valve seat 9 of the pilot valve 10 and that of the pressure equalization tube 16 is greater than the cross-section of the pressure equivalization passage means 8 in the valve disc 6.

The pilot valve control mechanism or biasing means 18 or 19 of the pilot valve, which is important for the proper function of the valve arrangement, is located in the pilot valve chamber 14 through which no fluid medium controlled by the valve will pass and which may be maintained at atmospheric pressure. By removing the pilot valve cap 13, the response pressure of the pilot valve 10 may be varied, by change of the weight 18 or by adjusting the spring 19, without interruption of the function of the valve arrangement.

Figure 2:
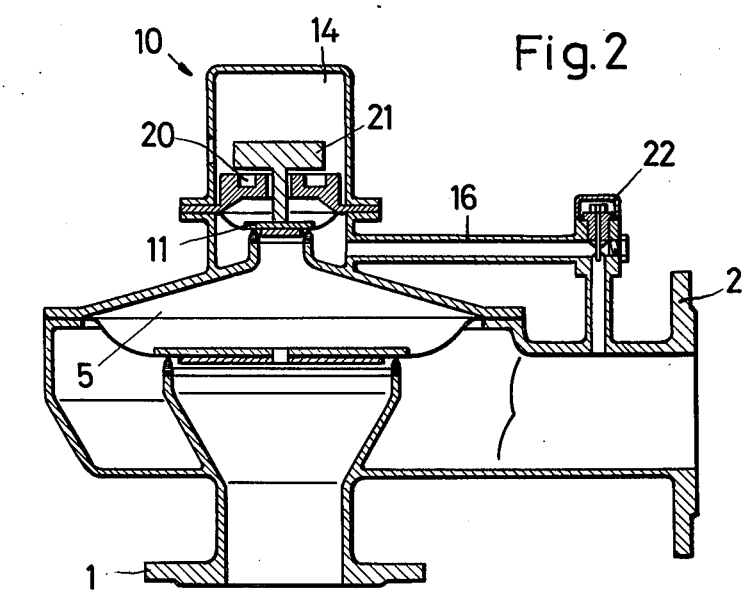

FIG. 2 illustrates a second embodiment according to the present invention in which the pilot valve 10 has a surge characteristic. The adjustment of the response pressure of the pilot valve 10 is in this case not provided by biasing means in form of a weight and/or in form of a spring, but the pilot valve includes in this embodiment a stationary permanent magnet 20 cooperating with an armature 21 connected to the valve disc 11 of the pilot valve. If the response pressure of the pilot valve 10 is reached, the valve disc 11 of the pilot valve starts to move away from its valve seat so that the distance between the permanent magnet 20 and the armature 21 is increased. Thereby the force exerted by the permanent magnet onto the armature will instantaneously and rapidly decrease and the pilot valve will open with a surge characteristic instantaneously to its maximum extent, when the response pressure for the pilot valve is reached. Thereby the pressure in the valve chamber 5 will simultaneously rapidly decrease so that the main valve will also rapidly open to the full extent.

By use of a pilot valve of the aforementioned kind, it is possible to obtain a valve arrangement of simple construction in which, when the response pressure of the pilot valve is reached, the main valve opens instantaneously to its maximum extent. This result is further improved by the use of membrane controlled valve discs, in which the surface at which the fluid pressure acts increases correspondingly at the start of the movement of the valve disc from the respective valve seat.

The pilot valve 10 is preferably dimensioned in such a manner that in order to reach its fully opened flow-cross section only a relatively short valve stroke is necessary. From this results, in the embodiment shown in FIG. 2, only a small change in the distance between permanent magnet 20 and the armature 21. At a small decrease of the operating pressure below the pressure of response of the pilot valve, the armature 21 will approach again the permanent magnet 20 so that the closing force of the pilot valve is increased. In this way the response pressure of the valve will come close to the closure pressure. By providing an adjustable throttle 22 in the pressure equalization tube 16 it is additionally possible to vary the pressure difference between the pressure of response and the closure pressure.

Figure 3:
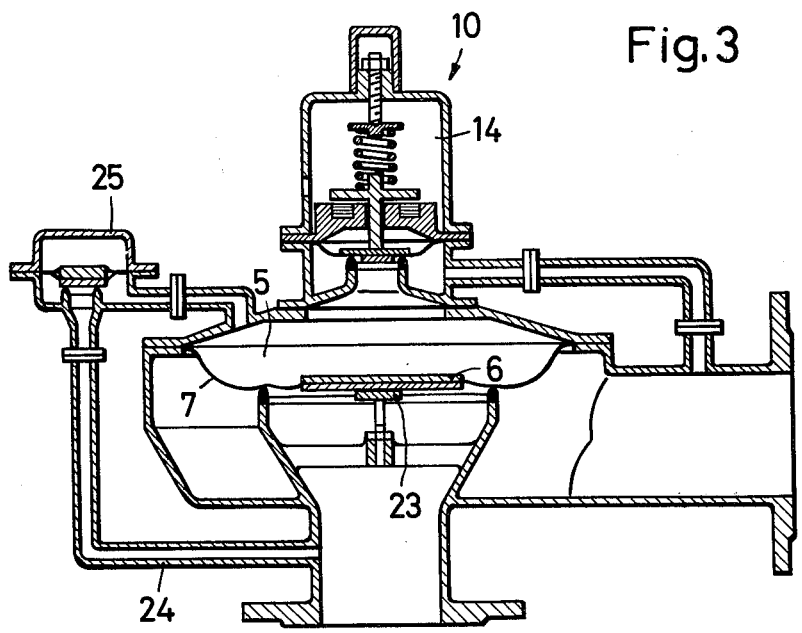

In the embodiments shown in FIGS. 2 and 3, it is not only possible to obtain an overpressure function, that is an exhaust of the container or the like connected to the valve, but also an underpressure function in which gaseous fluid may flow into the connected container. Since in the valve chamber 5 the same underpressure will prevail as in the container or the like connected to the inlet 1, the pressure in the outlet socket 2 will act on the lower face of the membrane 7 of the main valve and lift the latter when the product of pressure and surface area is equal to the weight of the valve disc 6 of the main valve. Since the response pressure of the pilot valve 10 is usually greater than the weight loaded response pressure of the main valve, the pilot valve 10 will remain closed during flow of gaseous fluid into the container or the like connected to the inlet socket 1 of the valve housing 2. The pilot valve control of the embodiments shown in FIGS. 1 and 2 will therefore not act, if an underpressure is maintained in the connected container or the like, so that in this case a direct weight loaded membrane valve is obtained.

Figure 4:
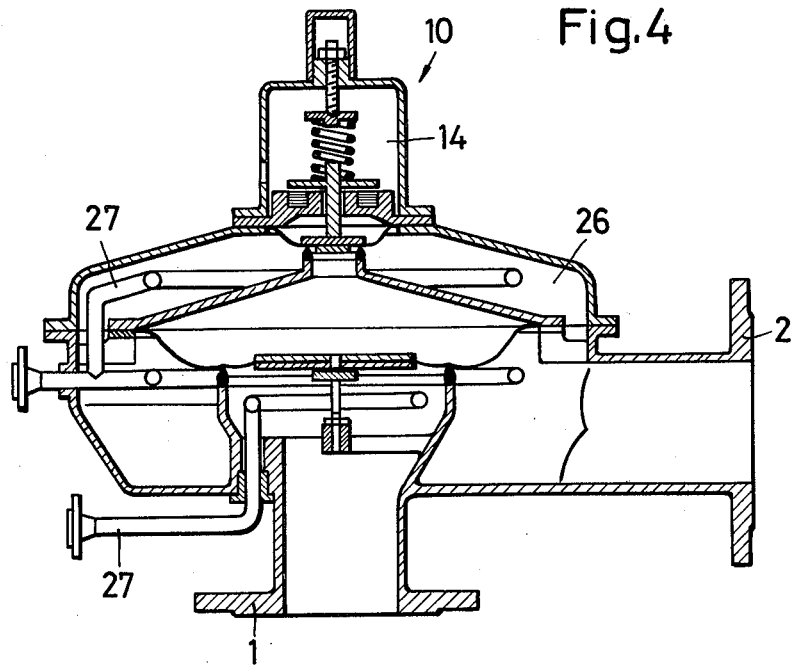
Figure 6:
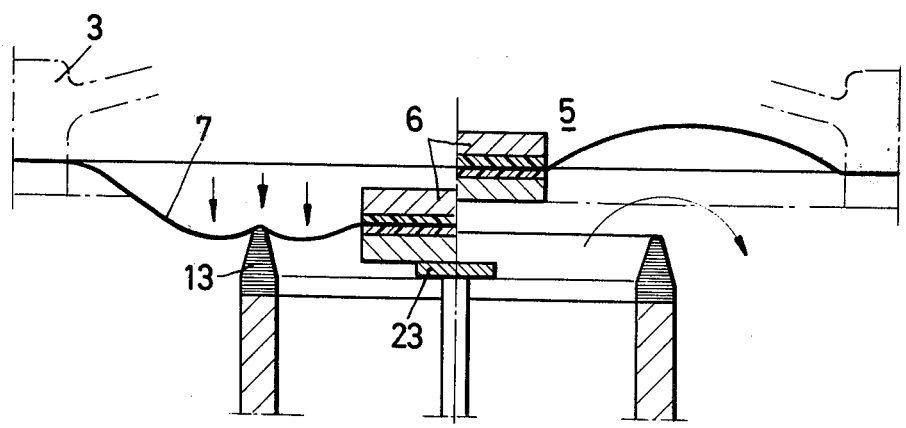
FIG. 6 illustrates a vertical cross-section of a detail of FIG. 3.

In practice it is often required that the pressure of response for exhaust of gaseous fluid from a container or the like connected to the valve is relatively high, whereas in the case an underpressure is prevailing in the container or the like connected to the valve, the response pressure should be low. However, since the first valve seat 6 of the main valve has necessarily a minimum weight, which, in the valve construction shown in FIG. 5, would influence the response pressure in the case in which an underpressure is maintained in the connected container or the like, it may be advantageous to form the first valve disc 6 of the main valve in the manner as illustrated in FIGS. 3, 4 and 6. In these constructions the diameter of the first valve disc 6 of the main valve is smaller than that of the first valve seat 4, and in which the valve disc 6 in the closed position of the main valve abuts against a support 23, which is adjustable in vertical direction relative to the valve seat 4. In this construction only the very light membrane 7 will act as weight, in the case an underpressure is maintained in the container or the like connected to the valve arrangement, so that an opening will be assured by a pressure difference of only a few millimeters water column.

If, however, flow of gaseous fluid into the container or the like connected to the valve arrangement is not desired, then the valve member 5 may be connected to the inlet socket 1 by a bypass conduit 24 in which a check valve 25 is provided.

In the embodiment shown in FIG. 4, the pilot valve outlet 15 is connected to the outlet socket 2 by means of a connecting chamber 26 of large volume. This connection is better suitable than the pressure equalization tube 16 with relatively small cross section, if the valve is used for controlling flow of a gaseous medium tending to produce deposits of dirt. Heating coils 27 are also arranged in the embodiment shown in FIG. 4 through which all elements, which are impinged by the fluid medium passing through the valve, may be heated.

It will be understood that each of the elements described above, or two or more together, may also find a useful application in other types of pilot controlled membrane valves differing from the types described above.

While the invention has been illustrated and described as embodied in a pilot controlled membrane valve, it is not intended to be limited to the details shown, since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pilot controlled valve for ventilating containers or the like connected thereto, comprising a valve housing having an inlet and an outlet; a first valve seat within said valve housing connected to said inlet; first valve means movable between a closed position engaging said first valve seat and an open position and including a first membrane extending transversely through said housing and defining with the latter a valve chamber to one side of said valve seat; overpressure passage means connecting said valve chamber with said inlet; a pilot valve having a second valve seat in communication with said valve chamber, second valve means including a second membrane and movable between a closed position engaging said second valve seat and an open position to which said second valve means is moved when a predetermined pressure is reached in said valve chamber, a second outlet for said pilot valve, means biasing said second valve means to said closed position and chamber means under atmospheric pressure surrounding said biasing means and separated from said second outlet by said second membrane, said biasing means being constructed to have a surge characteristic such that the biasing force of said biasing means tending to move said second valve means to said closed position decreases with increasing distance of said second valve means from said second valve seat thereby causing substantially instantaneous movement of said second valve means to the fully open position upon reaching said predetermined pressure in said valve chamber; a pressure-equalization tube connecting said second outlet with said outlet of said valve housing; and an adjustable throttle in said pressure equalization chamber.

2. A pilot controlled membrane valve as defined in claim 1, wherein said outlet of said valve housing is in the form of an outlet socket and wherein said pressure equalization tube has an injection port located in said outlet socket.

* * * * *